US009488296B1

(12) United States Patent
Lucas et al.

(10) Patent No.: US 9,488,296 B1
(45) Date of Patent: Nov. 8, 2016

(54) CRASH PROTECTION SLEEVE FOR A PARKING BRAKE WIRE

(71) Applicant: HONDA MOTOR CO., LTD., Tokyo (JP)

(72) Inventors: Michael Lucas, Plain City, OH (US); Nobuteru Fujii, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 21 days.

(21) Appl. No.: 14/699,630

(22) Filed: Apr. 29, 2015

(51) Int. Cl.
F16L 3/08 (2006.01)
B60T 11/04 (2006.01)
B60R 21/00 (2006.01)

(52) U.S. Cl.
CPC ............. *F16L 3/08* (2013.01); *B60R 21/00* (2013.01); *B60T 11/046* (2013.01); *B60G 2204/202* (2013.01)

(58) Field of Classification Search
CPC .............................................. B60G 2204/202
See application file for complete search history.

(56) References Cited

U.S. PATENT DOCUMENTS

| 2,648,109 | A | * | 8/1953 | Cline | B60T 11/046 |
| | | | | | 24/71.1 |
| 2,954,248 | A | | 9/1960 | Brickman | |
| 3,090,826 | A | * | 5/1963 | Cochran | F16B 5/121 |
| | | | | | 174/158 R |
| 3,227,407 | A | | 1/1966 | Soer | |
| 4,795,114 | A | * | 1/1989 | Usui | F16L 3/11 |
| | | | | | 248/62 |
| 4,909,462 | A | * | 3/1990 | Usui | F16L 3/1226 |
| | | | | | 248/68.1 |
| 5,009,376 | A | * | 4/1991 | Usui | F16L 55/035 |
| | | | | | 248/55 |
| 5,301,907 | A | * | 4/1994 | Julian | F16L 3/08 |
| | | | | | 174/135 |
| 5,544,849 | A | * | 8/1996 | Peterson | F16L 3/12 |
| | | | | | 248/74.1 |
| 5,579,663 | A | | 12/1996 | Likich et al. | |
| 6,254,042 | B1 | * | 7/2001 | Kogure | H02G 3/26 |
| | | | | | 248/74.1 |
| 6,631,876 | B1 | * | 10/2003 | Phillips | F16B 2/22 |
| | | | | | 248/229.16 |
| 7,775,138 | B2 | * | 8/2010 | Okamoto | B60T 11/046 |
| | | | | | 74/500.5 |
| 8,448,669 | B2 | | 5/2013 | Wen | |
| 8,567,015 | B2 | | 10/2013 | Ward et al. | |
| 2014/0231597 | A1 | * | 8/2014 | Buchwitz | B60T 11/046 |
| | | | | | 248/56 |
| 2015/0239446 | A1 | * | 8/2015 | Phillips | B60T 11/046 |
| | | | | | 188/2 D |
| 2015/0251642 | A1 | * | 9/2015 | Tanigaki | B60K 20/04 |
| | | | | | 188/2 D |

FOREIGN PATENT DOCUMENTS

| DE | 4243147 C1 * | 4/1994 | ............ B60K 13/04 |
| DE | 102005023008 B3 * | 6/2006 | ............ B60T 11/046 |
| FR | 2842268 A1 * | 1/2004 | ............ B60T 11/046 |
| JP | 2000102148 A * | 4/2000 | |
| JP | 2007283884 A * | 11/2007 | |

* cited by examiner

*Primary Examiner* — Nicole Verley
(74) *Attorney, Agent, or Firm* — Armstrong Teasdale LLP

(57) ABSTRACT

A parking brake system for a vehicle includes a parking brake wire configured to be routed along the vehicle to a wheel assembly and a mounting bracket coupled to the parking brake wire. The mounting bracket is configured to mount the parking brake wire to an undercarriage of the vehicle. The mounting bracket has an edge configured to face a fuel tank of the vehicle. A crash protection sleeve is coupled to the parking brake wire near the mounting bracket. The crash protection sleeve is positioned to engage the fuel tank prior to the edge of the mounting bracket engaging the fuel tank in an event of a vehicle crash. The crash protection sleeve may surround the parking brake wire and may prevent contact of the mounting bracket with the fuel tank.

20 Claims, 2 Drawing Sheets

US 9,488,296 B1

CRASH PROTECTION SLEEVE FOR A PARKING BRAKE WIRE

BACKGROUND

The present disclosure relates generally to crash protection sleeves for parking brake wires for vehicles.

Vehicles typically include a parking brake system for applying a parking brake for the vehicle. The parking brake system includes a hand or foot operated parking brake lever in the cabin of the vehicle. The parking brake lever has a parking brake wire extending therefrom. The parking brake wire is routed to the rear wheel assemblies of the vehicle to apply the parking brake when the lever is actuated. The parking brake wire is typically routed along the undercarriage of the vehicle to the rear wheel assemblies. Mounting brackets are used to mount the parking brake wire to the undercarriage in a particular wire layout. The wire layout is selected to provide clearance of the parking brake wire from other parts or components of the vehicle at the undercarriage of the vehicle.

Conventional parking brake systems are not without disadvantages. For instance, during a rear crash impact, the mounting brackets may contact the fuel tank. Sharp edges of the mounting brackets may pierce or cut the fuel tank. It may be difficult to change the shape or arrangement of the frame of the vehicle to reduce the crash stroke so the mounting bracket does not contact the fuel tank during a crash event as such redesign or changes may add engineering costs, product costs, a reduction in size or fuel capacity of the fuel tank, and the like. Additionally, in some cases, changes in the body shape may not be possible as such changes in shape may affect other components of the vehicle or the structural integrity of the vehicle. For example, such redesign to reduce the crash stroke may not meet other crash requirements. Additionally, it may be difficult to change the parking wire layout so the mounting bracket is not the first point of contact to the fuel tank during a crash event. For example, the parking brake wire needs clearance from other parts in addition to the fuel tank and there may not be a layout that satisfies other clearance requirements. Furthermore, some conventional vehicle designs provide a protective shield around the fuel tank to prevent the parking brake wire mounting bracket from contacting the fuel tank during a crash event. However, such protective shield surrounding the fuel tank adds weight to the vehicle the additional protective shield requires additional fasteners, brackets and the like which add more weight, cost and assembly time.

A need remains for a parking brake system that prevents mounting bracket contact with the fuel tank during a crash impact.

BRIEF DESCRIPTION

In one embodiment, a parking brake system for a vehicle is provided that includes a parking brake wire configured to be routed along the vehicle to a wheel assembly and a mounting bracket coupled to the parking brake wire. The mounting bracket is configured to mount the parking brake wire to an undercarriage of the vehicle. The mounting bracket has an edge configured to face a fuel tank of the vehicle. A crash protection sleeve is coupled to the parking brake wire near the mounting bracket. The crash protection sleeve is positioned to engage the fuel tank prior to the edge of the mounting bracket engaging the fuel tank in an event of a vehicle crash. The crash protection sleeve may surround the parking brake wire and may prevent contact of the mounting bracket with the fuel tank.

In another embodiment, a vehicle is provided that includes a frame having an undercarriage, a fuel tank mounted to the frame and exposed at the undercarriage, a wheel assembly mounted to the frame and a parking brake wire routed along the undercarriage to the wheel assembly. A mounting bracket is coupled to the parking brake wire. The mounting bracket mounts the parking brake wire to the undercarriage of the vehicle. The mounting bracket has an edge facing the fuel tank. A crash protection sleeve is coupled to the parking brake wire near the mounting bracket. The crash protection sleeve is positioned to engage the fuel tank prior to the edge of the mounting bracket engaging the fuel tank in an event of a vehicle crash.

In a further embodiment, a method of preventing inadvertent contact of a parking brake wire mounting bracket with a fuel tank of a vehicle in event of a crash of the vehicle is provided that includes coupling the parking brake wire mounting bracket to a parking brake wire and coupling a crash protection sleeve to the parking brake wire near the mounting bracket. The crash protection sleeve defines a protection envelope radially outward of the mounting bracket to ensure that the mounting bracket does not contact the fuel tank in event of a crash of the vehicle.

DETAILED DESCRIPTION

Various embodiments will be better understood when read in conjunction with the appended drawings. As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Figure 1:
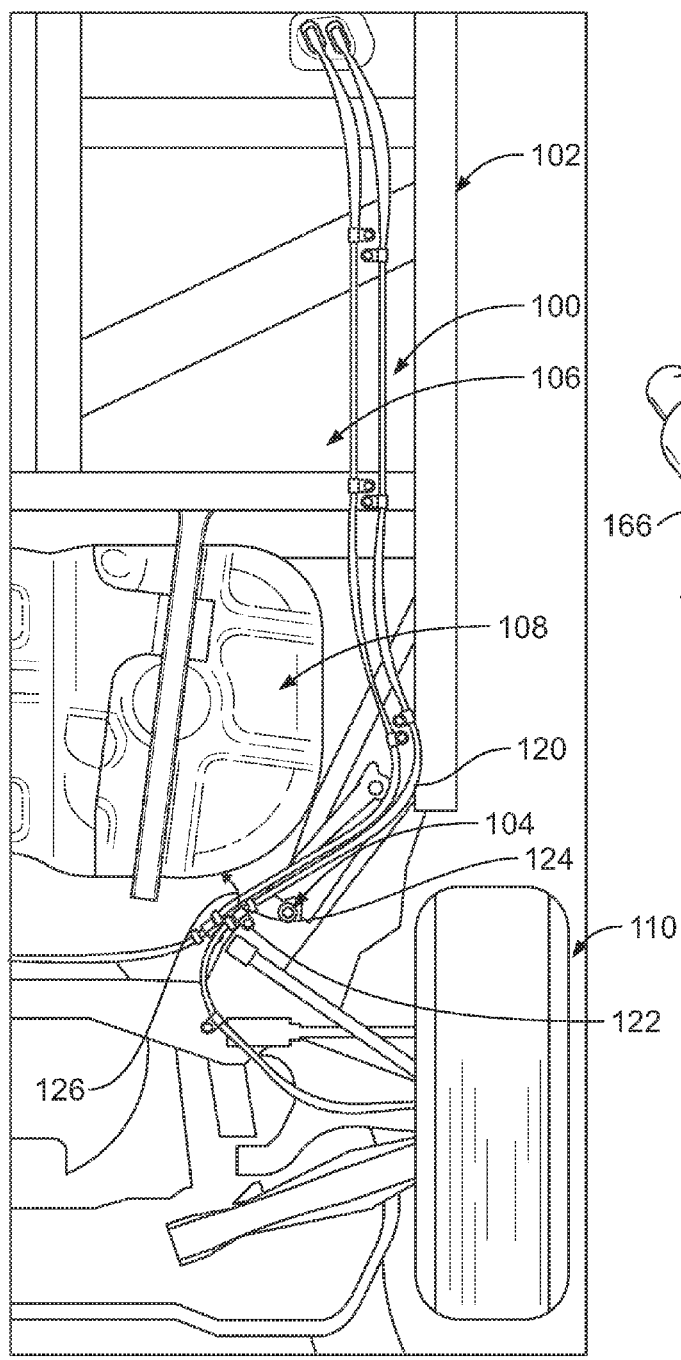
FIG. 1 is a bottom view of a portion of a parking brake system for a vehicle.

FIG. 1 illustrates a portion of a parking brake system 100 for a vehicle 102. The vehicle 102 has a frame 104 having an undercarriage 106. A fuel tank 108 is mounted to the frame 104 and exposed at the undercarriage 106. Wheel assemblies 110 (one shown) are mounted to the frame 104. The parking brake system 100 is operably coupled to the rear wheel assemblies 110. The parking brake system 100 may be operated to apply parking brakes of the wheel assemblies 110.

The parking brake system 100 includes parking brake wires 120 routed along the undercarriage 106 from inside the vehicle 102 to the wheel assemblies 110. As referred to herein, parking brake wires 120 include a wire that operatively couples a braking input device to a vehicle brake, and a protective conduit positioned around the wire at least partially along the length of the wire to protect the wire from damage. Mounting brackets 122 are coupled to the parking brake wire 120 and are used to secure the parking brake wires 120 in a particular layout along the undercarriage 106. The mounting brackets 122 may be secured to the vehicle 102, such as, but not limited to a fastener or by other devices or techniques.

The parking brake system 100 includes crash protection sleeves 124 coupled to the parking brake wire 120 near the mounting brackets 122. In an exemplary embodiment, crash protection sleeves 124 may be used with mounting brackets 122 positioned alongside the fuel tank 108 to prevent damage from such mounting brackets 122 during a side crash impact. Optionally, the crash protection sleeves 124 may be used with multiple mounting brackets 122. Alternatively, the crash protection sleeves 124 may be used only with the mount brackets 122 nearest and/or behind the fuel tank 108, such mounting brackets 122 being the mounting brackets 122 most likely to damage the fuel tank 108 in the event of a rear crash impact.

The parking brake wires 120 are laid out along the undercarriage 106 such that the mounting brackets 122 have a pre-crash clearance distance 126. While the parking brake wire layout may be selected to provide sufficient clearance distance, during some rear crash impacts, the frame 104 is designed to absorb some of the impact by crushing forward. As the frame 104 is crushed during the impact, the mounting brackets 122 may be pushed forward toward the fuel tank 108. The crash protection sleeves 124 insure some minimal clearance is maintained between the mounting brackets 122 and the fuel tank 108 such that no sharp edges of the mounting brackets 122 cut or pierce the fuel tank 108. The crash protection sleeves 124 prevent contact of the mounting brackets 122 with the fuel tank 108. The crash protection sleeves 124 define a protection envelop beyond the mounting bracket 122. The crash protection sleeves 124 prevent the fuel tank 108 from entering the protection envelope during an event of a vehicle crash.

Figure 2:
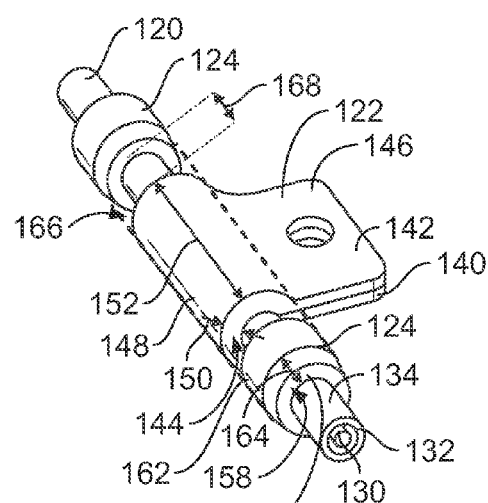
FIG. 2 is a perspective view of a portion of the parking brake system showing a parking brake wire with a mounting bracket and a pair of crash protection sleeves.

FIG. 2 illustrates a portion of the parking brake system 100 showing one of the parking brake wires 120 with a mounting bracket 122 coupled thereto and with a pair of crash protection sleeves 124 coupled thereto near the mounting bracket 122. The parking brake wire 120 includes an inner wire 130 and an outer jacket 132 surrounding the inner wire 130. The outer jacket 132 has an exterior that is exposed. Optionally, the inner wire 130 may move within the outer jacket 132, such as when the parking brake lever within the vehicle 102 (shown in FIG. 1) is actuated to apply the parking brake.

The mounting bracket 122 is a metal structure which may hold the parking brake wire 120 and may be mounted to the vehicle 102. In an exemplary embodiment, the mounting bracket 122 wraps around the parking brake wire 120 and includes an inner layer 140 and an outer layer 142. The inner layer 140 may face the frame 104 (shown in FIG. 1) of the vehicle 102 while the outer layer 142 may face away from the frame 104 of the vehicle 102. The mounting bracket 122 includes a wire channel 144 that receives the parking brake wire 120.

The inner and outer layers 140, 142 define tabs 146 at the end of the mounting bracket 122 opposite the wire channel 144. The tabs 146 are used to secure the mounting bracket 122 to the vehicle 102. Optionally, the tabs 146 may have openings extending therethrough which may receive a fastener or other securing device for securing the mounting bracket 122 the vehicle 102.

The mounting bracket 122 has an edge 148 opposite the tabs 146. The mounting bracket 122 may be mounted to the vehicle 102 such that the edge 148 (such as one of the edge ends) is the nearest portion of the mounting bracket 122 to the fuel tank 108 (shown in FIG. 1). In the illustrated embodiment, the mounting bracket is a single piece with the edge 148 being closed and connecting the inner and outer layers 140, 142. In alternative embodiments, the mounting bracket 122 may be multiple pieces (e.g., an inner piece and an outer piece) with the edge being open and clamping around the parking brake wire 120 as the mounting bracket 122 is mounted to the vehicle 102.

The mounting bracket 122 has a first radial thickness 150 defined beyond the exterior 134 of the parking brake wire 120 to the edge 148. The first radial thickness 150 is defined by the thickness of the metal sheet used to form the mounting bracket 122. The edge 148 is thus positioned a distance, equal to the first radial thickness 150, from the exterior 134.

The mounting bracket 122 has a width 152 measured between opposite sides of the mounting bracket 122. Optionally, the width 152 along the wire channel 144 may be equal to the width 152 along the tabs 146. Alternatively, the width 152 may be different along the wire channel 144 than along the tabs 146.

The crash protection sleeves 124 are coupled to the parking brake wire 120 near the mounting bracket 122. In an exemplary embodiment, each crash protection sleeve 124 may be manufactured from a synthetic material such as a plastic material, a rubber material, and the like. Optionally, the material of the crash protection sleeve 124 may be compliant such that the crash protection sleeve 124 may be partially compressed during the crash impact. The crash protection sleeves 124 extend further from the parking brake wire 120 than the mounting bracket 122 to ensure that the crash protection sleeves 124 are the first structure of the parking brake system 100 to engage the fuel tank 108. As such, the crash protection sleeves 124 prevent contact of the mounting bracket 122 with the fuel tank 108.

In an exemplary embodiment, the crash protection sleeves 124 are ring-shaped or donut-shaped and entirely circumferentially surround the parking brake wire 120. For example, each crash protection sleeve 124 includes an opening 158 therethrough and the parking brake wire 120 passes through the opening 158. The parking brake wire 120 may be fished through the crash protection sleeves 124 to position the crash protection sleeves 124 at an appropriate location along the parking brake wire 120. The crash protection sleeve 124 may be cylindrical in shape surrounding the opening 158. Optionally, edges of the crash protection sleeve 124 may be chamfered or rounded to prevent sharp edges on the crash protection sleeves 124. Alternatively, the crash protection sleeve 124 may be a split ring such that the crash protection sleeve 124 may be side loaded onto the parking brake wire 120 as opposed to fishing the parking brake wire 120 though the crash protection sleeve 124.

Each crash protection sleeve 124 has an interior 160 and an exterior 162. The interior 160 may directly engage the exterior 134 of the parking brake wire 120. The crash protection sleeve 124 has a second radial thickness 164 defined between the interior 160 and the exterior 162. The second radial thickness 164 is greater than the first radial thickness 150 to ensure that the exterior 162 of the crash protection sleeve 124 is positioned further from the exterior 134 of the parking brake wire 120 than the edge 148. Optionally, the crash protection sleeve 124 may be held on the parking brake wire 120 by an interference fit. Alternatively, the crash protection sleeves 124 may be held on the parking brake wire 120 using adhesive or other securing techniques.

The crash protection sleeves 124 entirely circumferentially surround the parking brake wire 120. Alternatively, the crash protection sleeves 124 may only partially surround the parking brake 120, with the crash protection sleeves 124 being positioned to face outward toward the fuel tank 108 to ensure that the crash protection sleeves 124 engage the fuel tank 108 prior to the mounting bracket 122 engaging the fuel tank 108 in an event of a vehicle crash. The crash protection sleeves 124 are securely fixed to the parking brake wire 120 to prevent movement of the crash protection sleeves 124 along the parking brake wire 120. The crash protection sleeves 124 may be coupled directly to the outer jacket 132 of the parking brake wire 120, and may extend radially outward from the outer jacket 132.

In an exemplary embodiment, a pair of crash protection sleeves 124 is utilized, with one crash protection sleeve 124 on each side of the mounting bracket 122. A protection envelope 166 is defined between the crash protection sleeves 124. The protection envelop 166 may be defined between the parking brake wire 120 and outer edges of the crash protection sleeves 124. For example, the protection envelope 166 may circumferentially surround the parking brake wire 120 to a distance equivalent to the second radial thickness 164. The mounting bracket 122 is located within the protection envelope 166. The protection envelope 166 extends beyond the edge 148 of the mounting bracket 122 to prevent impact of the mounting bracket 122 with the fuel tank 108.

In an exemplary embodiment, the crash protection sleeves 124 are mounted adjacent the mounting bracket 122. Optionally, the crash protection sleeves 124 may abut against opposite sides of the mounting bracket 122. Alternatively, as in the illustrated embodiment, gaps may be provided between the crash protection sleeves 124 and the mounting bracket 122. In such embodiments, it may be desirable to position the crash protection sleeves 124 near the mounting bracket 120 to ensure that the crash protection sleeves 124 engage the fuel tank 108 prior to the mounting bracket 122 engaging the fuel tank 108. For example, the crash protection sleeves 124 may be positioned distances 168, which are less than the width 152 of the mounting bracket 122, from the mounting bracket 122.

Figure 3:
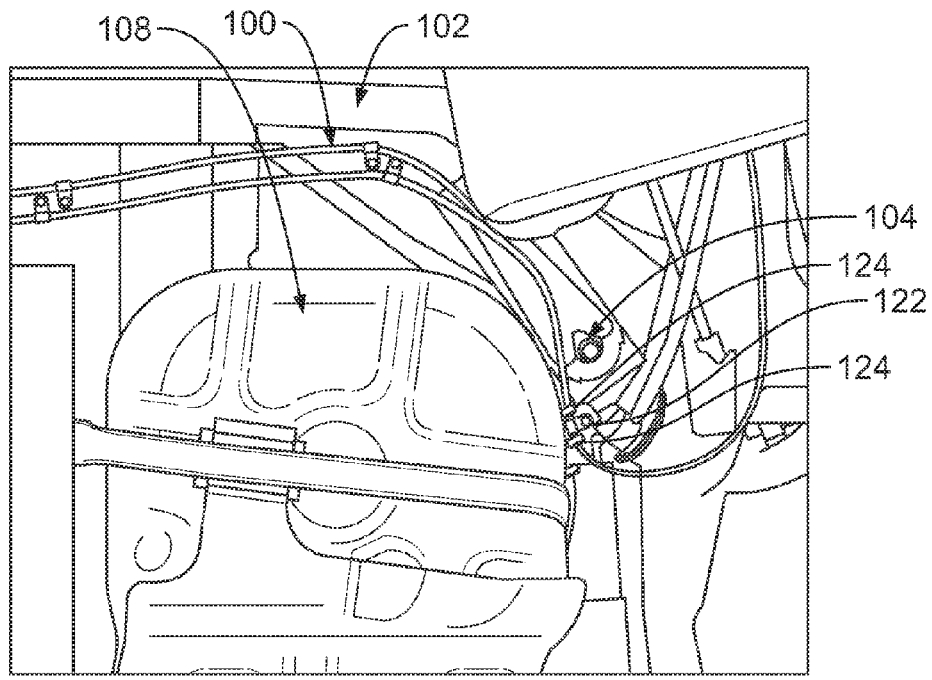
FIG. 3 is a bottom view of a portion of the vehicle showing the position of the parking brake system relative to a fuel tank of the vehicle after a crash event.
Figure 4:
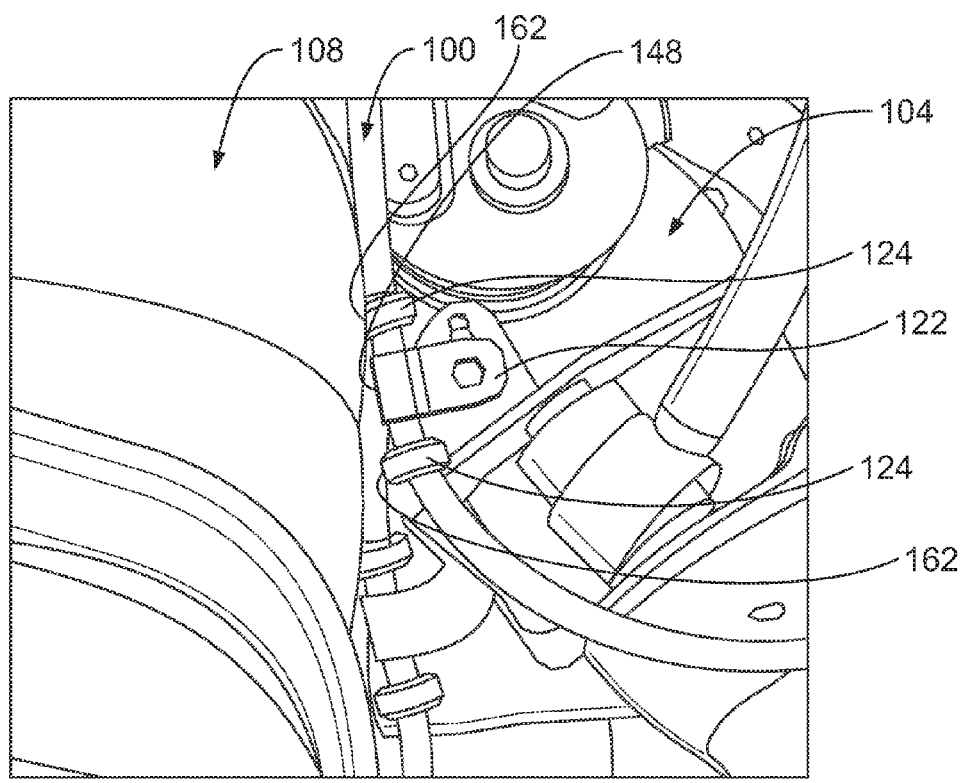
FIG. 4 is an enlarged view of a portion of the vehicle showing the position of the parking brake system after the crash event.

FIG. 3 illustrates a portion of the vehicle 102 showing the position of the parking brake system 100 relative to the fuel tank 108 after a crash event. FIG. 4 is an enlarged view of a portion of the vehicle 102 showing the position of the parking brake system 100 after the crash event. FIGS. 3 and 4 show one of the crash protection sleeves 124 pressed against the fuel tank 108.

During the crash event, the frame 104 may absorb the impact of the crash and move forward reducing the clearance distance (shown in FIG. 1) to almost zero. However, the crash protection sleeves 124 engage the fuel tank 108 to ensure that the mounting bracket 122 does not engage the fuel tank 108. One or both of the crash protection sleeves 124 may be pressed against the fuel tank 108. With reference to FIG. 4, because the crash protection sleeves 124 are thicker than the mounting bracket 122, the exteriors 162 of the crash protection sleeves 124 are positioned radially further outward than the edge 148 (such as further than the edge ends) and the crash protection sleeves 124 prevent the mounting bracket 122 from engaging the fuel tank 108. The sharp edge 148 (e.g., the edge ends) does not pierce or cut the fuel tank 108, which reduces the risk of fuel leakage and fire. Optionally, the crash protection sleeves 124 may partially compress against the fuel tank 108; however the crash protection sleeves 124 are thick enough to ensure that the mounting bracket 122 does not engage the fuel tank 108. Optionally, when the crash protection sleeve 124 engages the fuel tank 108, the fuel tank 108 may move forward. For example, the fuel tank 108 may be a plastic fuel tank, which may crush or inward or forward away from the mounting bracket 122.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments without departing from their scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the various embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, paragraph (f), unless and until such claim limitations expressly use the phrase "means for" followed by a statement of function void of further structure.

This written description uses examples to disclose the various embodiments, and also to enable a person having ordinary skill in the art to practice the various embodiments, including making and using any devices or systems and performing any incorporated methods. The patentable scope of the various embodiments is defined by the claims, and may include other examples that occur to those skilled in the art. Such other examples are intended to be within the scope of the claims if the examples have structural elements that do not differ from the literal language of the claims, or the examples include equivalent structural elements with insubstantial differences from the literal language of the claims.

The foregoing description of embodiments and examples has been presented for purposes of illustration and description. It is not intended to be exhaustive or limiting to the forms described. Numerous modifications are possible in light of the above teachings. Some of those modifications have been discussed and other will be understood by those skilled in the art. The embodiments were chosen and described for illustration of various embodiments. The scope is, or course, not limited to the examples or embodiments set forth herein, but can be employed in any number of applications and equivalent devices by those of ordinary skill in the art. Rather it is hereby intended the scope be defined by the claims appended hereto. Additionally, the features of various implementing embodiments may be combined to form further embodiments.

What is claimed is:

1. A parking brake system for a vehicle, the parking brake system comprising:
   a parking brake wire configured to be routed along the vehicle to a wheel assembly;
   a mounting bracket coupled to the parking brake wire, the mounting bracket being configured to mount the parking brake wire to an undercarriage of the vehicle, the mounting bracket having an edge configured to face a fuel tank of the vehicle; and
   a crash protection sleeve coupled to the parking brake wire near the mounting bracket, the crash protection sleeve being positioned to engage the fuel tank prior to the edge of the mounting bracket engaging the fuel tank in an event of a vehicle crash.

2. The parking brake system of claim 1, wherein the crash protection sleeve surrounds the parking brake wire.

3. The parking brake system of claim 1, wherein the crash protection sleeve prevents contact of the mounting bracket with the fuel tank.

4. The parking brake system of claim 1, wherein the mounting bracket has a first radial thickness beyond an exterior of the parking brake wire, the crash protection sleeve having a second radial thickness beyond the exterior of the parking brake wire, the second radial thickness being greater than the first radial thickness.

5. The parking brake system of claim 1, wherein the crash protection sleeve extends beyond the mounting bracket to define a protection envelope beyond the mounting bracket, the crash protection sleeve preventing the fuel tank from entering the protection envelope.

6. The parking brake system of claim 1, wherein the crash protection sleeve is donut shaped and circumferentially surrounds the parking brake wire.

7. The parking brake system of claim 1, wherein the mounting bracket has a width, the crash protection sleeve being mounted to the parking brake wire adjacent the mounting bracket a distance less than the width of the mounting bracket from the mounting bracket.

8. The parking brake system of claim 1, further comprising a second crash protection sleeve coupled to the parking brake wire on an opposite of the mounting bracket from the crash protection sleeve.

9. The parking brake system of claim 1, wherein the crash protection sleeve is securely fixed to the parking brake wire to prevent movement of the crash protection sleeve along the parking brake wire.

10. The parking brake system of claim 1, wherein the crash protection sleeve comprises a rubber material.

11. The parking brake system of claim 1, wherein the parking brake wire has an outer jacket, the crash protection sleeve being coupled to, and extending radially outward from, the outer jacket.

12. The parking brake system of claim 1, wherein the crash protection sleeve defines a first crash protection sleeve, the parking brake system further comprising a second crash protection sleeve coupled to the parking brake wire with the mounting bracket positioned between the first crash protection sleeve and the second crash protection sleeve, the first and second crash protection sleeves having exterior surfaces positioned further from the parking brake wire than the edge.

13. A vehicle comprising:
    a frame having an undercarriage;
    a fuel tank mounted to the frame and exposed at the undercarriage;
    a wheel assembly mounted to the frame;
    a parking brake wire routed along the undercarriage to the wheel assembly;
    a mounting bracket coupled to the parking brake wire, the mounting bracket mounting the parking brake wire to the undercarriage of the vehicle, the mounting bracket having an edge facing the fuel tank; and
    a crash protection sleeve coupled to the parking brake wire near the mounting bracket, the crash protection sleeve being positioned to engage the fuel tank prior to the edge of the mounting bracket engaging the fuel tank in an event of a vehicle crash.

14. The vehicle of claim 13, wherein the crash protection sleeve prevents contact of the mounting bracket with the fuel tank.

15. The vehicle of claim 13, wherein the mounting bracket has a first radial thickness beyond an exterior of the parking brake wire, the crash protection sleeve having a second radial thickness beyond the exterior of the parking brake wire, the second radial thickness being greater than the first radial thickness.

16. The vehicle of claim 13, wherein the crash protection sleeve extends beyond the mounting bracket to define a protection envelope beyond the mounting bracket, the crash protection sleeve preventing the fuel tank from entering the protection envelope.

17. The vehicle of claim 13, wherein the crash protection sleeve is donut shaped and circumferentially surrounds the parking brake wire.

18. The vehicle of claim 13, wherein the crash protection sleeve is securely fixed to the parking brake wire to prevent movement of the crash protection sleeve along the parking brake wire.

19. The vehicle of claim 13, wherein the crash protection sleeve defines a first crash protection sleeve, the parking brake system further comprising a second crash protection sleeve coupled to the parking brake wire with the mounting bracket positioned between the first crash protection sleeve and the second crash protection sleeve, the first and second crash protection sleeves having exterior surfaces positioned further from the parking brake wire than the edge.

20. A method of preventing inadvertent contact of a parking brake wire mounting bracket with a fuel tank of a vehicle in event of a crash of the vehicle, the method comprising:
    coupling the parking brake wire mounting bracket to a parking brake wire; and
    coupling a crash protection sleeve to the parking brake wire near the mounting bracket, the crash protection sleeve defining a protection envelope radially outward of the mounting bracket to ensure that the mounting bracket does not contact the fuel tank in event of a crash of the vehicle.

* * * * *